J. W. WEINLAND.
SAFETY HANGER FOR BRAKE BEAMS.
APPLICATION FILED SEPT. 18, 1915.

1,165,732.

Patented Dec. 28, 1915.
2 SHEETS—SHEET 1.

Witnesses:

Inventor:
Joseph W. Weinland
by
Atty.

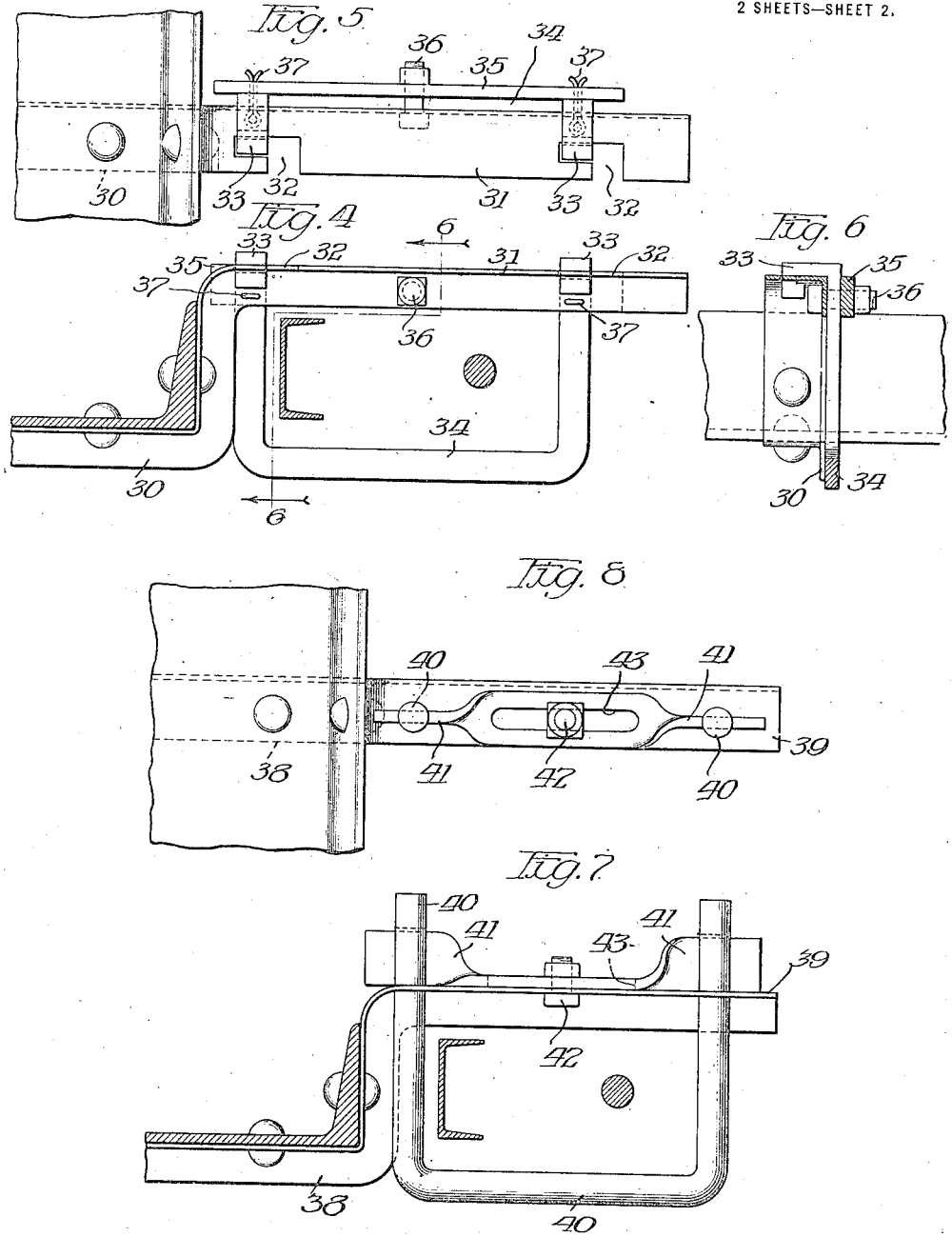

UNITED STATES PATENT OFFICE.

JOSEPH W. WEINLAND, OF CHICAGO, ILLINOIS, ASSIGNOR TO AMERICAN STEEL FOUNDRIES, OF NEW YORK, N. Y., A CORPORATION OF NEW JERSEY.

SAFETY-HANGER FOR BRAKE-BEAMS.

1,165,732.

Specification of Letters Patent. Patented Dec. 28, 1915.

Application filed September 18, 1915. Serial No. 51,333.

*To all whom it may concern:*

Be it known that I, JOSEPH W. WEINLAND, a citizen of the United States, and resident of Chicago, in the county of Cook and State of Illinois, have invented certain new and useful Improvements in Safety-Hangers for Brake-Beams, of which the following is a specification.

My invention relates to car trucks and has particular reference to a novel emergency supporting means for brake beams.

It is well known that many railway accidents are caused by the dropping of a brake beam due to wear or breakage of the supporting devices therefor.

An object in the present construction is to provide a device which shall normally be out of engagement with the beam but which shall underlie the same and obviate the possibility of accident due to breakage of the supporting devices for the beam.

It is well understood that an emergency support should provide for the ready removal of the beam when desirable in order to effect repairs or replacements thereof and an object in the present construction is to provide means whereby the emergency support may be removed out of the plane of the beam to permit its being dropped and removed.

Figure 1:
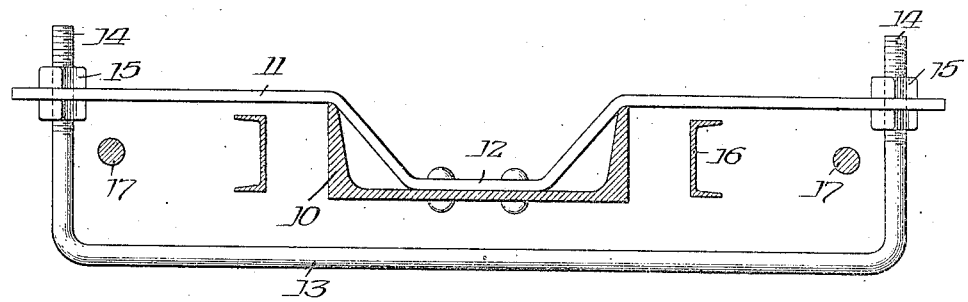
Figure 2:
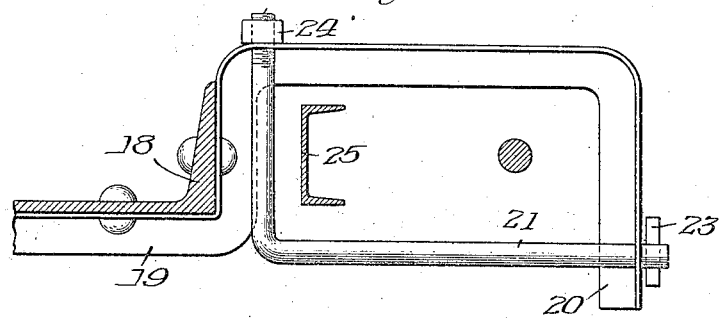
Figure 3:
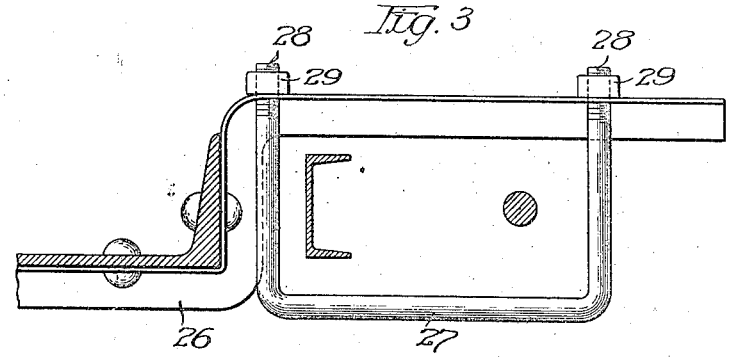

The invention will be more readily understood by reference to the accompanying drawings, wherein, Figure 1 is an elevation partly in section showing one form of my novel safety device; Fig. 2 is a similar view of a slight modification; Fig. 3 illustrates a still further modification; Fig. 4 illustrates a still further modification; Fig. 5 is a plan view of the construction shown in Fig. 4; Fig. 6 is a section on the line 6—6 of Fig. 4; Fig. 7 is an elevation of a further modification, and Fig. 8 is a plan view thereof.

In car trucks it will be understood that the side frames are commonly connected by a spring plank usually of channel or angular form. Such a spring plank is indicated at 10, in Fig. 1. To this member is secured a bar 11, the middle portion 12, of which is depressed into engagement with the web of the channel and riveted thereto. The ends of the bar are apertured to accommodate a long U-shaped rod 13, the ends 14, of which are threaded and engage the apertures in the bar 11, nuts 15, holding the rod in proper position. The brake beams, the channel compression member 16, and rod tension member 17, of which are indicated in section, are located within the U-shaped bolt and reciprocate freely without contact with the parts which I have described. However, upon breakage it will be seen that the beam cannot fall on the track. In case it is desirable to remove the beam, the nuts 15, may be removed and the beam dropped and taken out.

In the construction of Fig. 2, the channel spring plank 18, has an angle bar 19, secured thereto, this bar being bent into the form of an inverted U, the outer free end 20, thereof being apertured to accommodate the end of a rod 21, bent at right angles and threaded at its opposite end 22. Both ends of the rod project through apertures in one of the legs of the angle bar 19, the lower outer end of the rod being held by a pin 23, while the upper end is held by a nut 24. The brake beam indicated at 25, is located within the space bounded by the bar and rod but may be removed upon removal of the rod as may be readily understood.

In Fig. 3 the bar 26 remains the same except that its outer end portion is not bent downward as in Fig. 2. A U-shaped rod 27, engages apertures in the bar 26, the upper ends 28, of the U member being threaded and accommodating nuts 29, by which the rod is held in place. In the constructions of Figs. 4 to 6, the bar 30, is shaped similar to that shown in Fig. 3, but in the horizontal leg 31, of the bar I provide notches 32, which are undercut and accommodate the hooked ends 33, of a U-shaped bar 34. The rod is engaged as in a bayonet joint. As a means for securing the bar in its proper position I provide a locking bar 35, held to the bar 30, by a bolt 36, cotters 37, engaging the bars 30, 34.

In the construction of Figs. 7 and 8, the bar 38, is provided with vertical apertures in its horizontal web 39, and a U-bolt 40, is accommodated thereby. The bolt is slotted near its upper ends and a large key 41, engages the slots in the ends of the rod. To prevent longitudinal movement of the key I may provide the bolt 42, which engages the key and the horizontal leg 39. This bolt is seated in a slot 43, in the key which permits extended longitudinal movement of the key such as is necessary to free either end thereof from the rod.

I claim—

1. In a safety hanger for brake beams, the combination of a rigid arm mounted to project over a brake beam, and a removable rod mounted on said arm and projecting beneath said brake beam and normally out of contact therewith, substantially as described.

2. In a safety device for brake beams, the combination of a spring plank, a bar secured to said spring plank and projecting over a brake beam, a rod engaging said bar said rod underlying said brake beam, and means for removably attaching said rod and bar, substantially as described.

3. In a safety device for brake beams, the combination of a bar adapted to project over a brake beam, and a U-shaped rod underlying the brake beam and removably secured to the bar, substantially as described.

4. In a safety device for brake beams, the combination of a spring plank, a rigid bar secured to said spring plank and projecting laterally over a brake beam in its normal position, and a U-shaped rod having a threaded end adapted to coöperate with said bar and to be removably secured thereto, said rod underlying the brake beam and adapted to prevent accidental displacement thereof, substantially as described.

Signed at Chicago, Ill., this 10th day of September, 1915.

JOSEPH W. WEINLAND.

Witnesses:
CHAS. F. MURRAY,
T. D. BUTLER.